United States Patent [19]

Gibson et al.

[11] Patent Number: 4,760,875
[45] Date of Patent: * Aug. 2, 1988

[54] CONTROLLING SEAL SYSTEM IN ROTARY REGENERATIVE AIR PREHEATERS

[75] Inventors: Stanley Gibson, Bangor; Colin Tindall, Ballynahinch, both of Northern Ireland

[73] Assignee: Davidson & Company Ltd., Belfast, Northern Ireland

[*] Notice: The portion of the term of this patent subsequent to Sep. 9, 2003 has been disclaimed.

[21] Appl. No.: 830,764

[22] Filed: Feb. 19, 1986

Related U.S. Application Data

[62] Division of Ser. No. 646,703, Aug. 30, 1984, Pat. No. 4,610,297.

[30] Foreign Application Priority Data

Sep. 23, 1983 [GB] United Kingdom ................. 8325512

[51] Int. Cl.$^4$ ............................................. F28D 17/04
[52] U.S. Cl. ............................................. 165/4; 165/9
[58] Field of Search ......................................... 165/9, 4

[56] References Cited

U.S. PATENT DOCUMENTS

| | | | |
|---|---|---|---|
| 3,232,335 | 2/1966 | Kalbfleisch | 165/9 |
| 3,999,597 | 12/1976 | Sato | 165/9 |
| 4,058,158 | 11/1977 | Blom et al. | 165/9 |
| 4,301,858 | 11/1981 | Mock | 165/9 |
| 4,306,612 | 12/1981 | Baker et al. | 165/9 |

Primary Examiner—Albert W. Davis, Jr.
Attorney, Agent, or Firm—Merchant, Gould, Smith, Edell, Welter & Schmidt

[57] ABSTRACT

Control of the seal of a rotary regenerative air preheater is provided by a plurality of inductance sensors (S1–S8) arranged around the path of travel of seal parts borne by the rotating part of the preheater. When these are sealing frames borne on hoods of a stationary matrix type preheater (12) drive means such as magnetic actuators (5) are fed power signals through slip rings (4). When they are seal strips on a rotating matrix type, the drive means are mounted on the sector plates of the stationary body. A control circuit compares the signals received sequentially from the sensors and drives appropriate one or ones of the drive means to bring the sealing means to a predetermined axial relationship, or to hold them there. The sensors may be paired with comparison sensors in the same environment whereby to reduce errors due to changes in temperature etc.

4 Claims, 4 Drawing Sheets

CONTROLLING SEAL SYSTEM IN ROTARY REGENERATIVE AIR PREHEATERS

This is a division of application Ser. No. 646,703, filed Aug. 30, 1984, now U.S. Pat. No. 4,610,297.

FIELD OF THE INVENTION

This invention relates to the control of seals in air preheaters.

BACKGROUND OF THE INVENTION

United Kingdom Patent No. 1559679 and Application No. 2091003 disclosed how a sensor may be used to determine the proximity of sealing systems in rotary regenerative air pre-heaters and how to adjust the gap (or the extent of contact) in them using magnetic drive means controlled from those sensors.

The sensors in those prior documents are mounted on moving hoods of a stationary matrix regenerator. This brings a difficulty with it. The signals are of low amplitude and they have to be transmitted through contacts such as a slip ring between the rotating hood and the stationary parts of the device. The regenerators work in very hostile environments and because of this and the low amplitude of the signals we have found that unless very special care is taken with the design of the slip rings the noise level in the signal is unacceptably high and may result in erractic functioning of the magnetic drive.

SUMMARY OF THE INVENTION

In order to avoid having to provide special slip ring constructions and in order to give ourselves the possibility of mounting the sensors on a stationary part (which might either be the stationary matrix of a rotating hood regenerator or the stationary sector plates of a rotating matrix regenerator) we have evolved an entirely different construction and method of operation.

In this, sensors are positioned on a nonrotating part around the path of relative movement of the two parts of the regenerator (hood and stationary matrix or sector plate and rotating matrix). As a seal borne on the moving part sweeps past each sensor in turn a control signal is derived from that sensor. This is dealt with by a control circuit (which can be stationary and outside the hostile environment in which the regenerator is placed) and is converted to a drive signal. This drive signal is communicated to a magnetic drive device which activates the sealing gap adjustment means at a time when the latter is in close proximity with the given sensor. If that particular sensor perceives that the seal is at too great a gap it will give a signal to the drive such that it will be closed to a certain extent. The drive means is then held on that setting until the sealing means which it is controlling is in proximity with a next sensor. The signal from the next sensor is then fed to that drive means which if necessary adjusts itself and maintains the new setting until a subsequent sensor is passed, and so on. This construction allows it to be the power signal and not the control signal which is communicated through a slip ring to a moving part. This signal being at a high amplitude and current level is not susceptible to interference from noise and is comparatively easily conveyed through conventional slip ring constructions.

It will be seen also that this construction and control method allows the use of magnetic drive on rotating matrix type regenerators, something which would in practice be difficult for the systems seen in the said earlier UK applications.

There may be sensors near the hub at the extreme periphery and at intermediate radial positions on the seal frame or on the sector plate, driving appropriately positioned magnetic drive means on the movable element.

When the assembly and method is being used on rotatable matrix machines it would be desirable to use the particularly adapted sensors which have been disclosed in our UK Patent Application No. 83.20962 filed the 3rd Aug. 1983 which discloses a sensor which consists of a U-shaped yoke on the parallel legs of which are mounted coils of unequal number of turns. The yoke is mounted behind a coverplate through which its ends are accessible and the cover plate is discontinuous between the ends of the yokes—most suitably there will be a comparatively narrow parallel side slit in the cover plate.

DESCRIPTION OF THE DRAWINGS AND OF A PREFERRED EMBODIMENT

Figure 1:
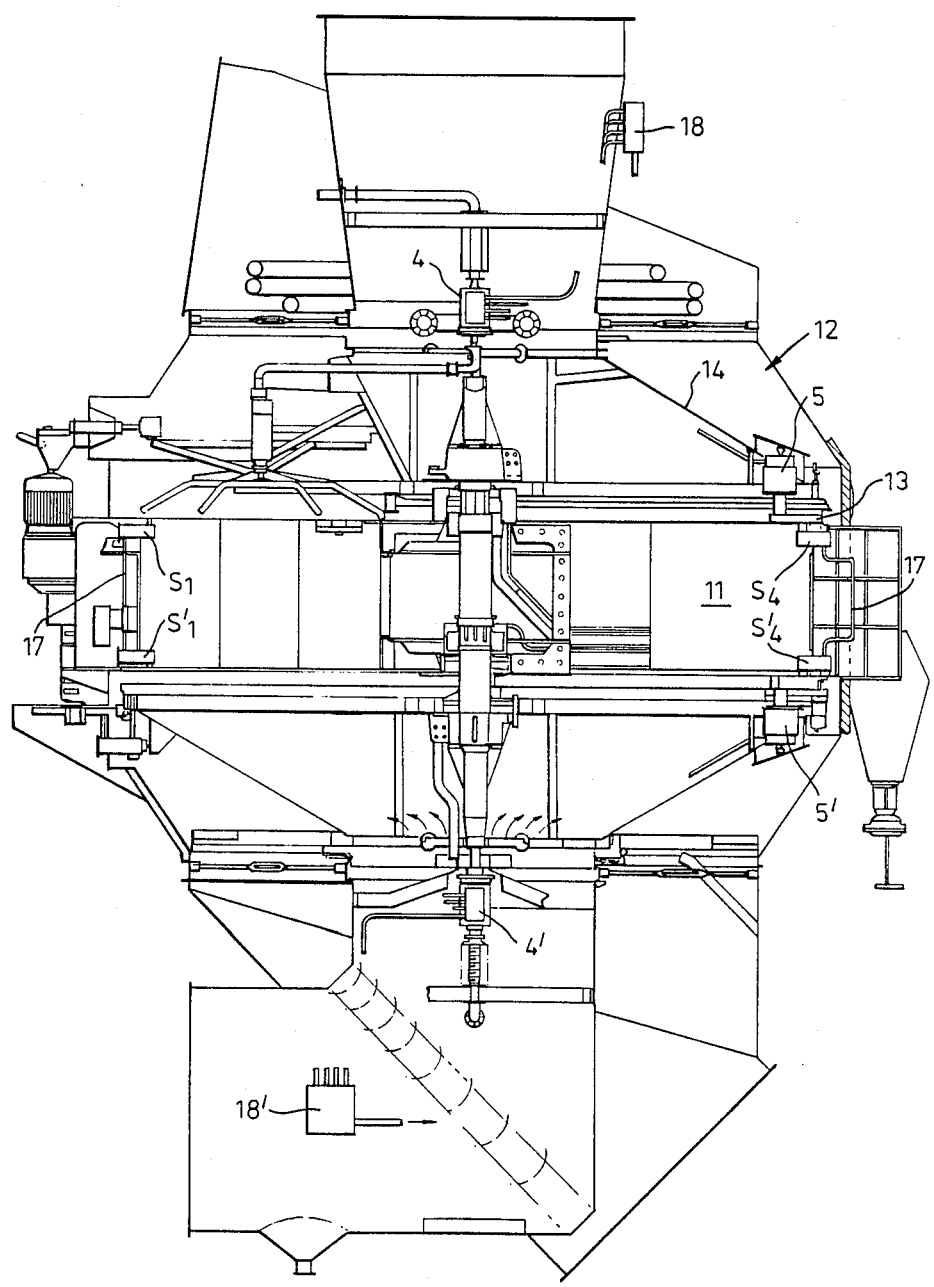
FIG. 1 is a side part-sectional view of a rotating hood regenerative air preheater showing the position of sensors and drive assemblies.
Figure 2:
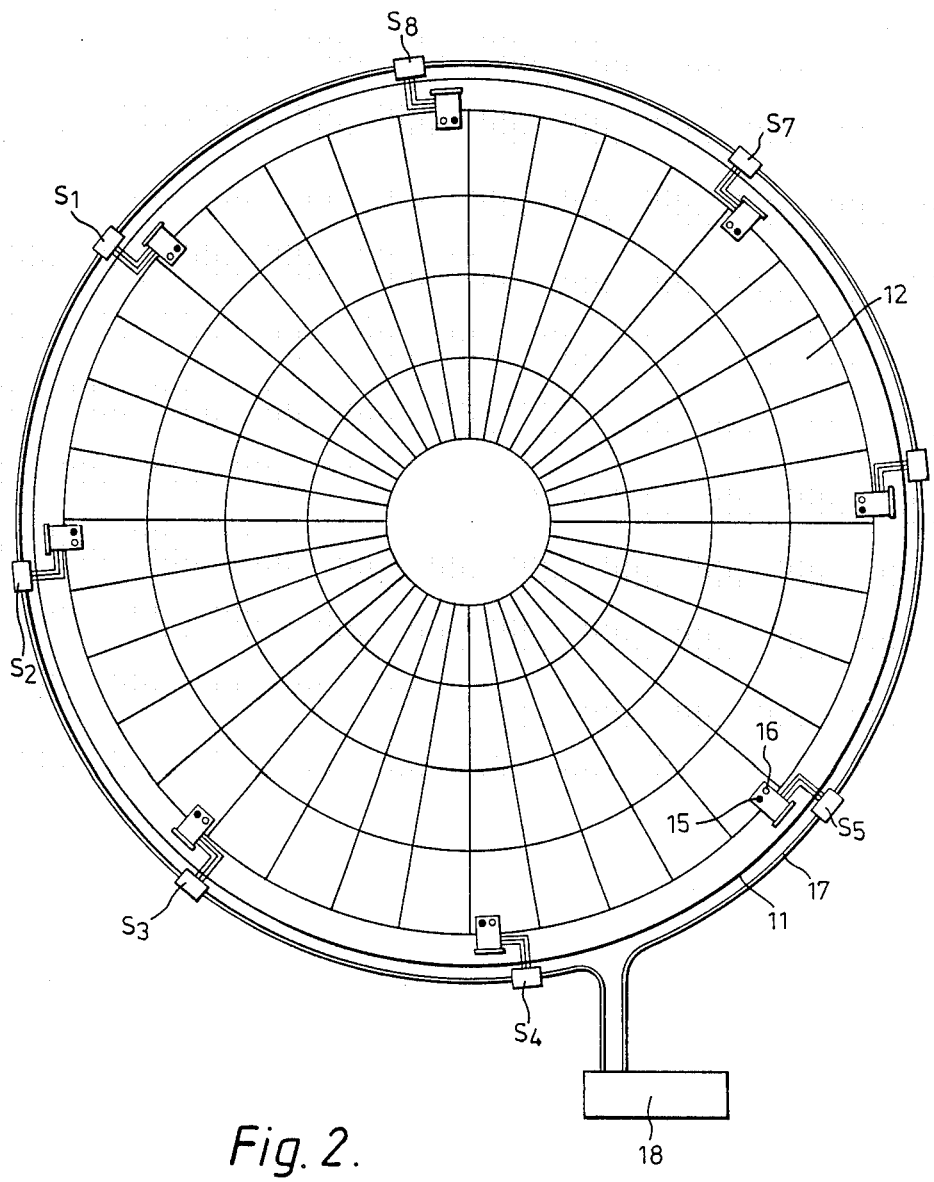
FIG. 2 is a plan view of the regenerative air preheater of FIG. 1.
Figure 3:
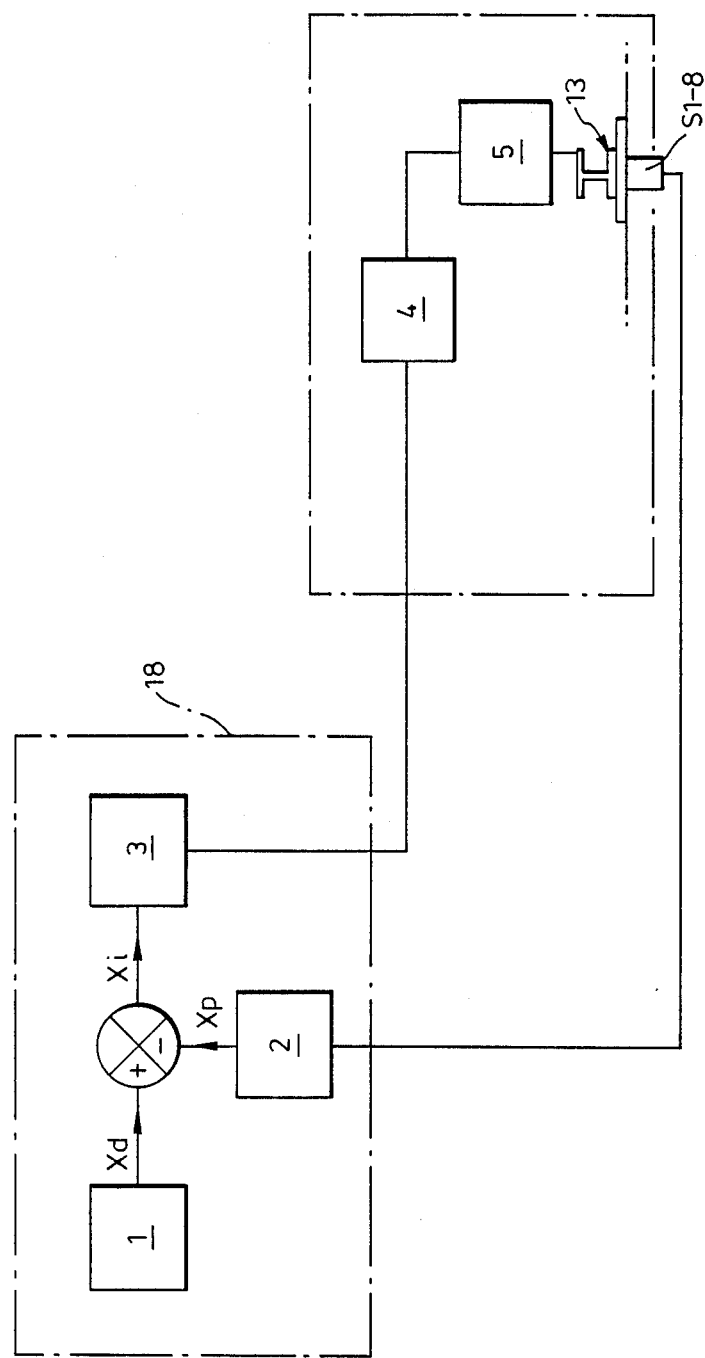
FIG. 3 is a block diagram of the circuitry involved.

As seen in FIGS. 1 to 3, a series of sensor assemblies S1–S8 are mounted at regular intervals around the periphery of the upper face of the stationary body 11 of a stationary matrix/rotating hood regenerative air preheater 12. Corresponding assemblies S'1–S'8 are similarly mounted round the lower face, but the following description will be given for only one of these series; the arrangement for the other is identical, mutatis mutandis. Alternatively, the sensor assemblies S1–S8 may be located at a said radial position or near the hub of the body 11. The number and position of the sensor assemblies S1–S8 is dependent on the size of the air preheater and the speed of rotation.

Each sensor detects inductively the proximity of the sealing frame 13 borne on the face of the rotating hood 14 adjacent to the end face of the matrix. Each assembly S1–S8 includes a "live" sensor 15 and a "dummy" sensor 16, indicated (FIG. 2) by full and open circles respectively. Suitable sensors for use on a stationary matrix machine are to be seen in our said UK application No. 2091003, these sensing the proximity of comparatively massive sealing frames on the hoods. Wiring 17 from each of these sensors is taken to a control box 18.

The "dummy" sensors 15 experience the same environment as the "live" ones 16 and serve to eliminate or reduce (e.g. for example, being in a bridge circuit with the live sensors) errors due to fluctuating conditions. They may have a physically preset gap representing the predetermined desired gap provided between them and an element representing part of a sealing frame.

In the control cabinet the input Xp from each of the sensor assemblies S1–S8 successively is processed in circuit 2 and compared with a demand position signal Xd generated in Circuit 1 (FIG. 3).

The signal Xi derived from the comparison in the comparator is fed to the power circuitry 3 and thence through conventional power slip rings 4 to magnetic drive devices 5 mounted on the rotating hoods, to lift the sealing frames or allow them to lower to adjust the axial relationship between the seal frame 4 and the sensors and hence with the end faces of the matrix.

Suitable magnetic drive devices are disclosed in UK patent No. 1559679 as well as in the said UK application No. 2091003.

This signal Xi is maintained until a signal from a succeeding sensor out of the sensor assemblies S1–S8 indicates, as the hood passes it, that the gap is now wrongly set when that signal will alter the signal Xi and cause an adjustment in the positioning of the sealing frame.

It can be seen that all the sensing and comparatively low amplitude signal circuitry is stationary; the control box may be and preferably is quite remote from the regenerator so that its electronic elements are not subject to the hostile environment in which the regenerator works. However, control signals passing from that box to the magnetic drive devices being of comparatively high amplitude or power can readily pass through conventional slip ring constructions to the drive devices borne on the rotating part.

Figure 4:
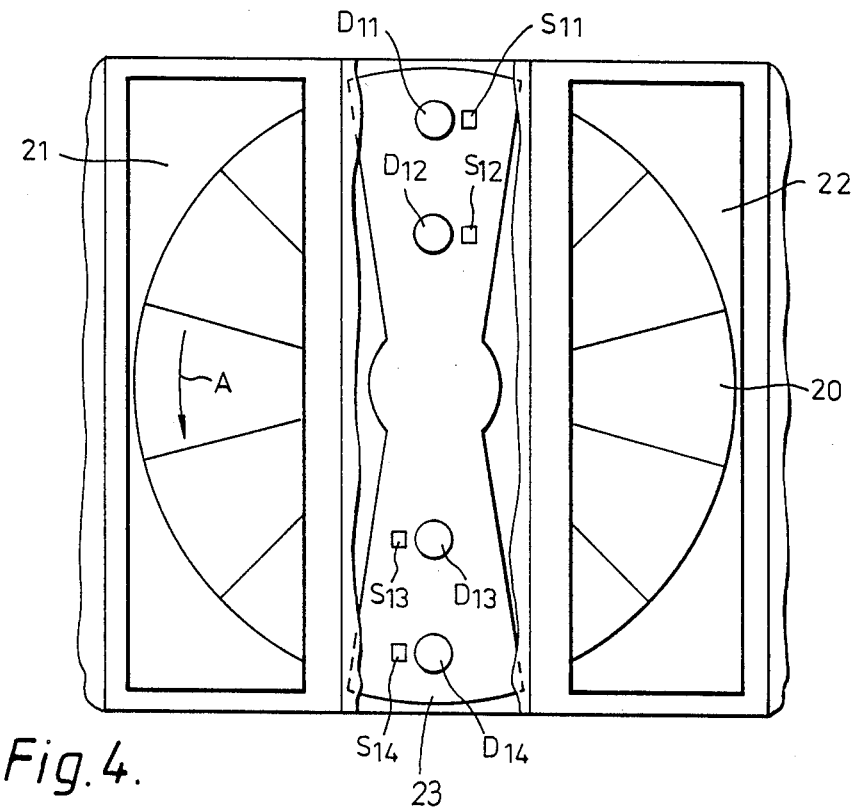
FIG. 4 is a sectional plan view of a rotating matrix regenerative air preheater showing the position of the sensors.
Figure 5:
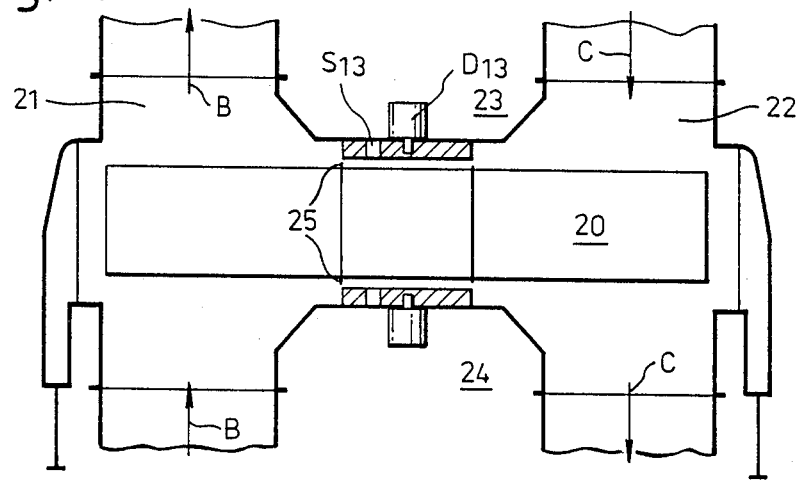
FIG. 5 is a sectional elevational view of the regenerative air preheater of FIG. 4.

FIGS. 4 and 5 show a preheater with a rotating heat-exchange matrix and stationary ducts and sector plates. The matrix 20, rotatable in the sense of arrow A, extends into ducts 21,22 for air and gas respectively flowing at C and B. Sector plates 23,24 are located between the ducts 21,22 one on each side of the matrix 20 and offer sealing surfaces to sealing strips 25 borne on the end face of the matrix, each sector plate 21,22 having two wings carrying inductance sensors S11 to S14 and magnetic drive devices D11 to D14. The sensors used in this type of machine are preferably those disclosed in UK Patent Application No. 83.20962, wherein a U-shaped core has it parallel legs surmounted by unequal coils, the legs being arranged in a common plane normal to the end faces of the matrix and also including or coming close to including the line of the seal strip 25 at its point of nearest approach. As can be seen from FIG. 5, the sensor and drive arrangement on the sector plate 23 above the matrix 20 is the same as that on the sector plate 24 below the matrix 20.

As shown in FIG. 4 the drive devices D11 to D14 are arranged on a diametrical line. The number of drive devices along that line is dependent on the size of the air pre-heater. Each drive device D11–D14 has a corresponding sensor S11–S14 which controls its operation, the sensor being placed in a position in advance of the corresponding drive device. For large air preheaters it may be necessary to provide sets of two or more drive devices, each set having drive devices spaced circumferentially on the sector plate. Each set would then have its own sensor.

In the embodiment of FIGS. 4 and 5 the outputs of the sensors S11–S14 are passed to a control box (not shown) as in the embodiment of FIGS. 1 to 3. There is a similar strategy of control, with one sensor governing the position set by the sector plate in relation to the sealing strips until it becomes apparent from the signal received from the subsequent sensor that correction is needed, in which case corrective drive is applied.

It is often found that the air preheaters flex relative to the hub and then each wing of the sector plates 23 and 24 may have a corresponding arrangement of sensors and drive devices.

It is possible to provide a dummy sensor adjacent each sensor S11–S14 for temperature compensations, which is particularly important at the hot end of the rotating matrix air preheater. Alternatively, circuitry in the control cabinet may be used to achieve this.

What is claimed is:

1. A rotary regenerative air preheater comprising: means for sealing between relatively rotatable parts of the pre-heater, said relatively rotatable parts being a stationary heat exchange matrix and a rotating part having at least one gas conducting hood, a plurality of drive means on said hood for driving the sealing means in a predetermined axial gap relationship said drive means being spaced apart in the path of relative rotation of the parts, control means comprising a plurality of electrical sensors placed sequentially in stationary position on the stationary part in the path of relative rotation of the parts, an electrical control circuit common to said sensors and drive means, each of said sensors being electrically linked through the circuit to at least one associated said drive means, the circuit including means for comparing the sensed axial gap relationship at each sensor with a signal representative of a predetermined axial gap relationship and driving the appropriate drive means around said path to bring the sealing means to the predetermined axial gap relationhsip, and power supply means to the drive means including slip rings about the axis of rotation of the hood, whereby the sealing means is sequentially checked on a plurality of occasions during each relative rotation by comparing the sensed axial gap relationship at each sensor with the predetermined axial gap relationship, and said sealing means is adjusted as necessary.

2. A rotary regenerative air preheater according to claim 1 wherein the sensors are inductance sensors.

3. A rotary regenerative air preheater according to claim 2 wherein at least some of said sensors have adjacent them a compensating sensor having a preset gap, the compensating sensor and said sensor being in a bridge circuit in the control circuit, whereby to at least reduce effects of the environment in which the said sensors work.

4. A rotary regenerative air preheater according to claim 2 wherein the predetermined axial relationship is a gap of between 1 and 2 mm.

* * * * *